(12) United States Patent
Heinrich et al.

(10) Patent No.: US 9,024,843 B2
(45) Date of Patent: May 5, 2015

(54) WEARABLE COMPUTER WITH CURVED DISPLAY AND NAVIGATION TOOL

(75) Inventors: Mitchell Heinrich, San Francisco, CA (US); Gabriel Taubman, Brooklyn, NY (US); Ryan Geiss, San Jose, CA (US); Max Braun, San Francisco, CA (US); Casey Ho, San Jose, CA (US)

(73) Assignee: Google Inc., Mountain View, CA (US)

( * ) Notice: Subject to any disclaimer, the term of this patent is extended or adjusted under 35 U.S.C. 154(b) by 881 days.

(21) Appl. No.: 13/173,773

(22) Filed: Jun. 30, 2011

(65) Prior Publication Data

US 2013/0002545 A1 Jan. 3, 2013

(51) Int. Cl.
*G09G 5/00* (2006.01)
*G06F 3/0354* (2013.01)
*G06F 3/0485* (2013.01)
*G02B 27/01* (2006.01)

(52) U.S. Cl.
CPC .......... *G06F 3/03547* (2013.01); *G06F 3/0485* (2013.01); *G09G 2380/02* (2013.01); *G02B 27/017* (2013.01); *G02B 2027/0178* (2013.01); *G02B 2027/0187* (2013.01)

(58) Field of Classification Search
USPC ............................................. 345/8; 359/630
See application file for complete search history.

(56) References Cited

U.S. PATENT DOCUMENTS

| | | | |
|---|---|---|---|
| 5,748,185 A * | 5/1998 | Stephan et al. | 345/173 |
| 5,850,211 A * | 12/1998 | Tognazzini | 345/158 |
| 6,037,936 A * | 3/2000 | Ellenby et al. | 715/764 |
| 6,414,696 B1 * | 7/2002 | Ellenby et al. | 715/762 |
| 7,500,747 B2 | 3/2009 | Howell et al. | |

(Continued)

FOREIGN PATENT DOCUMENTS

| | | |
|---|---|---|
| EP | 809172 | 11/1997 |
| EP | 2267588 | 12/2010 |
| WO | 2011/140061 | 11/2011 |

OTHER PUBLICATIONS

Cakmakci, O., et al., "Head-Worn Displays: A Review," Journal of Display Technology, vol. 2, pp. 199-216, 2006.

(Continued)

*Primary Examiner* — Dorothy Harris
(74) *Attorney, Agent, or Firm* — McDonnell Boehnen Hulbert & Berghoff LLP

(57) ABSTRACT

Disclosed are systems, methods, and devices for interfacing with a wearable heads-up display via a touch-operable input device. The wearable heads-up display may include a display element for receiving and displaying display information received from a processor, and may also include a wearable frame structure supporting the display element and having a side-arm extending away from the display element. In some embodiments, the display information may appear at least partially curved to a user. In some embodiments, only a portion of the display information is shown on the at least one display element. The side-arm may be configured to secure the heads-up display to a user's body in a manner such that the display element is disposed within a field of view of the user. The touch-operable input device secured to the wearable frame structure is configured to sense at least one of a position and movement of a touch or finger along a planar direction relative to a surface of the input device, and to provide corresponding input information to the processor. A navigation tool may also be displayed on the at least one display element for indicating the location of the touch on the touch-operable input device.

20 Claims, 12 Drawing Sheets

(56) References Cited

U.S. PATENT DOCUMENTS

| | | |
|---|---|---|
| 7,581,833 B2 | 9/2009 | Howell et al. |
| 7,771,046 B2 | 8/2010 | Howell et al. |
| 7,792,552 B2 | 9/2010 | Thomas et al. |
| 7,922,321 B2 | 4/2011 | Howell et al. |
| 8,109,629 B2 | 2/2012 | Howell et al. |
| 2002/0126066 A1* | 9/2002 | Yasukawa et al. ............... 345/8 |
| 2002/0186348 A1* | 12/2002 | Covannon et al. ............ 351/240 |
| 2004/0128012 A1 | 7/2004 | Lin |
| 2006/0007056 A1 | 1/2006 | Ou |
| 2006/0119539 A1* | 6/2006 | Kato et al. ....................... 345/8 |
| 2006/0238495 A1 | 10/2006 | Davis |
| 2007/0052672 A1* | 3/2007 | Ritter et al. ................... 345/156 |
| 2007/0262965 A1 | 11/2007 | Hirai et al. |
| 2007/0296646 A1* | 12/2007 | Yamamoto et al. ............... 345/8 |
| 2010/0013910 A1* | 1/2010 | Farr ................................ 348/51 |
| 2010/0079356 A1* | 4/2010 | Hoellwarth ....................... 345/8 |
| 2010/0110368 A1 | 5/2010 | Chaum |
| 2010/0117971 A1 | 5/2010 | Chen |
| 2010/0149073 A1 | 6/2010 | Chaum et al. |
| 2010/0219943 A1 | 9/2010 | Vanska et al. |
| 2010/0283711 A1* | 11/2010 | Sadler ............................... 345/8 |
| 2011/0194029 A1* | 8/2011 | Herrmann et al. ............. 348/569 |
| 2011/0231757 A1 | 9/2011 | Haddick et al. |
| 2011/0300831 A1 | 12/2011 | Chin |
| 2012/0021806 A1* | 1/2012 | Maltz ........................... 455/566 |
| 2012/0311499 A1 | 12/2012 | Dellinger et al. |
| 2013/0002724 A1* | 1/2013 | Heinrich et al. .............. 345/676 |

OTHER PUBLICATIONS

International Search Report and Written Opinion for Int. App. No. PCT/US2012/041311, completed Feb. 25, 2013.

* cited by examiner

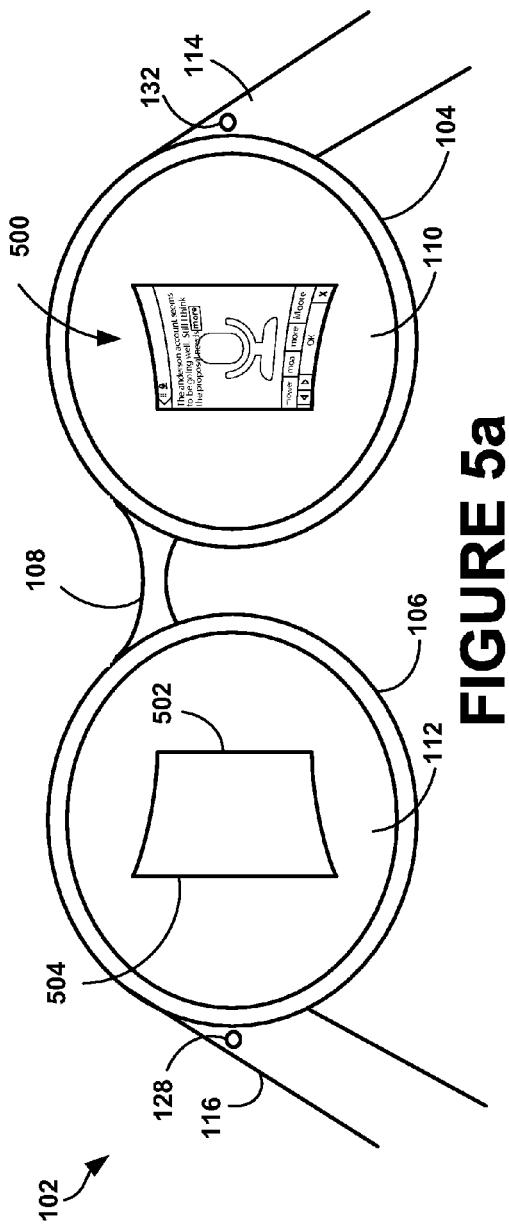
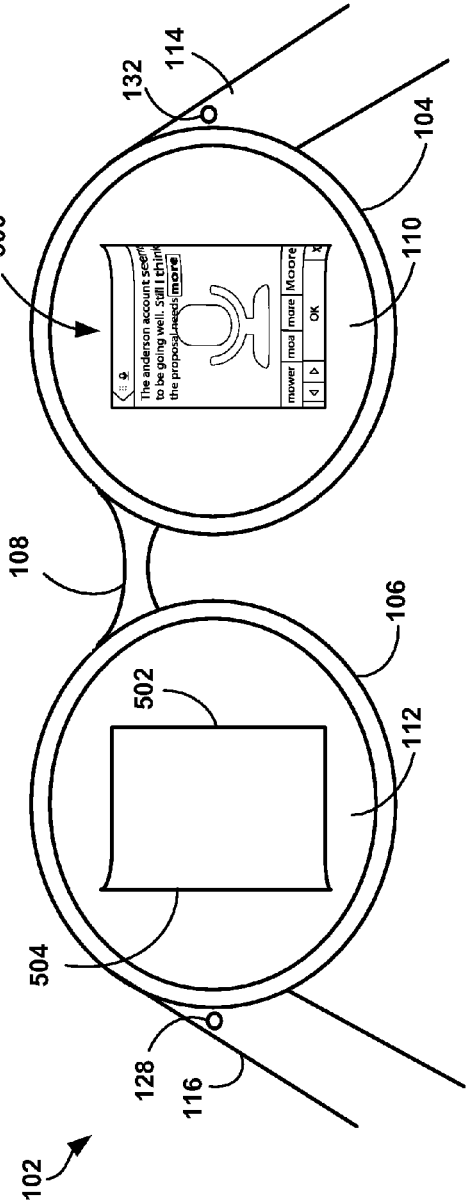
FIGURE 5a
FIGURE 5b

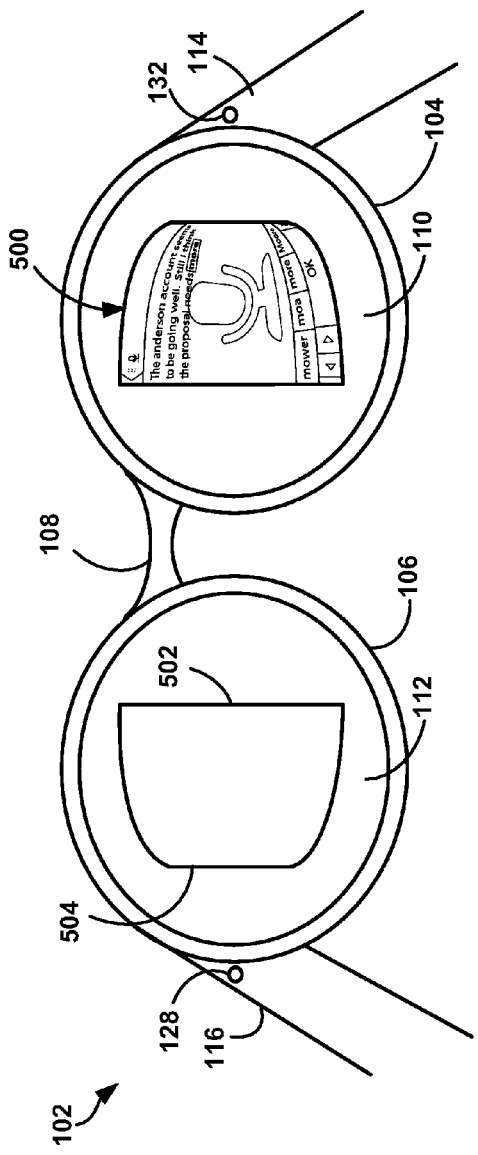
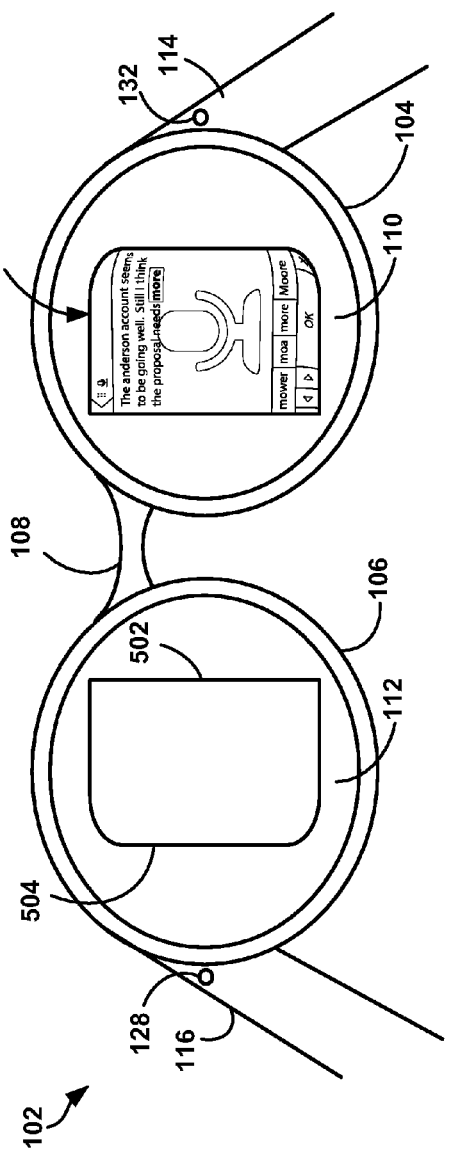
FIGURE 7a
FIGURE 7b

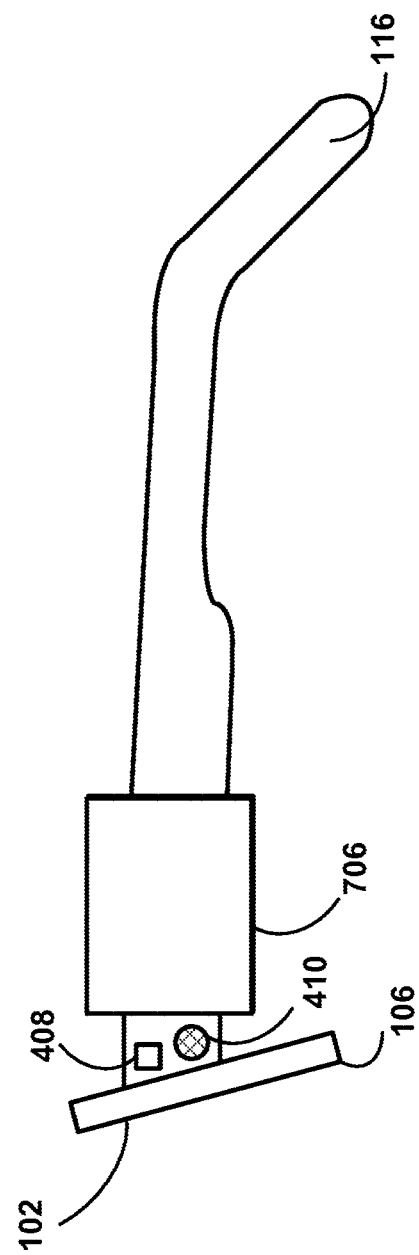

WEARABLE COMPUTER WITH CURVED DISPLAY AND NAVIGATION TOOL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs) or wearable heads-up displays. A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

Some head-mounted displays may include a side-mounted touchscreen or touchpad interface. Generally the touchscreen is orthogonal to the display that the user sees. Because of the orthogonal relationship between the touchscreen and the display, a left-right ambiguity exists. Specifically, it is not intuitive to some users whether a forward (e.g., from the user's back to the front) or backward gesture on the touchscreen will result a right or a left movement of a cursor on the display.

SUMMARY

Disclosed herein are improved methods and devices for controlling and interfacing with a wearable heads-up display. In an exemplary embodiment, the wearable heads-up display may include a processor, and at least one display element configured to receive display information from the processor and to display the display information. The display information appears at least partially curved when viewed on the at least one display element. The wearable heads-up display may further include a wearable frame structure supporting the at least one display element and having at least one side-arm extending away from the display element, the side-arm securing the heads-up display to a user's body in a manner that, when secured, places the display element within a user's field of view. The wearable heads-up display may further include a touch-operable input device secured to the at least one side-arm of the wearable frame structure and configured to sense at least one of a position and movement of a touch along a planar direction relative to a surface of the input device, and to provide corresponding input information to the processor.

In this manner, an improved method and device for interfacing with, and providing input to, the wearable heads-up display may be provided. For example, in response to receiving input at the processor from the touch-operable input device, the processor may transmit new display information to the display element. Further input could cause further updates to the display information or may cause the processor to execute other functions.

In one exemplary embodiment, the display information appears to curve toward the user, and in another embodiment the display information appears to curve away from the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the figures:

FIGS. 5a and 5b illustrate examples of display information shown on the wearable heads-up display device;

FIGS. 7a and 7b illustrate alternative embodiments of display information shown on the wearable heads-up display device;

FIG. 9 illustrates an additional or alternative integrated touch-operable input device;

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

The methods and systems disclosed herein generally relate to wireless directional identification and communication between wearable heads-up displays. First, examples of wearable heads-up displays will be discussed, followed subsequently by discussions of their operation and input interaction.

Figure 1:
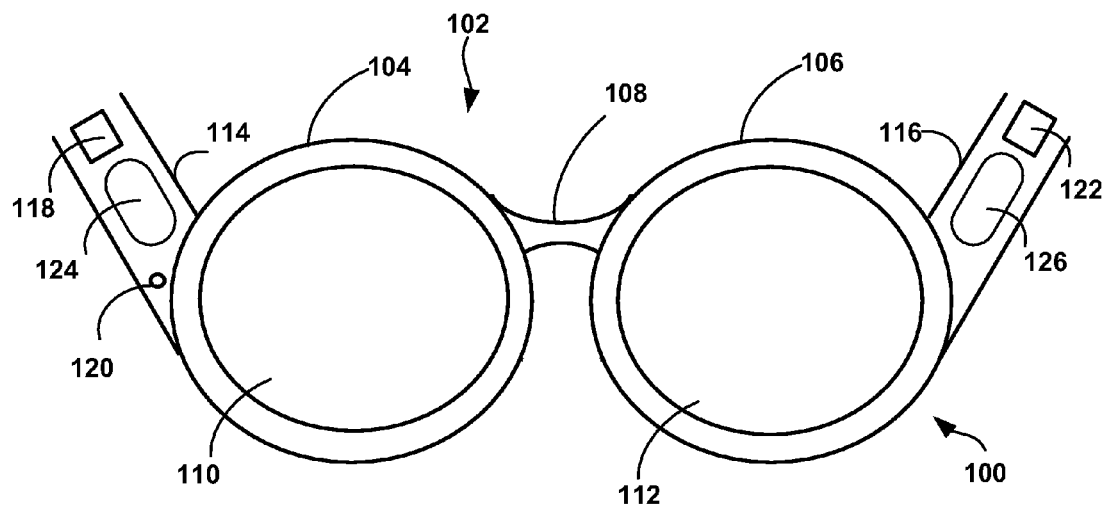
FIG. 1 shows an example embodiment of the exterior of a wearable heads-up display device including display elements.

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used. As illustrated in FIG. 1, the eyeglasses 102 comprise frame elements including lens-frames 104 and 106 and a center frame support 108, lens or display elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic and/or metal, or may be formed of a hollow structure of similar material so as to allow wiring and component interconnects to be internally routed through the eyeglasses 102. Each of the display elements 110 and 112 may be formed of any material that can suitably display a projected image or graphic. Each of the display elements 110 and 112 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and finger or touch-operable input devices or pads 124, 126. The on-board computing system 118 is shown to be positioned on the extending side-arm 114 of the eyeglasses 102; however, the on-board computing system 118 may be provided on other parts of the eyeglasses 102 or even remote from the glasses (e.g. 118 could be connected wirelessly or wired to 102). The on-board computing system 118 may include a processor and memory, for example. The on-board computing system 118 may be configured to receive and analyze data from the video camera 120 and the touch-operable input devices 124, 126 (and possibly from other sensory devices, user interfaces, or both) and generate images for output from the display elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more of a gyroscope or an accelerometer, for example. Other sensing devices may be included within the sensor 122 or other sensing functions may be performed by the sensor 122.

The touch-operable input devices 124, 126 are shown mounted on the extending side-arms 114, 116 of the eyeglasses 102. Each of touch-operable input devices 124, 126 may be used by a user to input commands. The touch-operable input devices 124, 126 may sense at least one of a position and a movement of a touch or finger via capacitive sensing, resistance sensing, or a surface acoustic wave process, among other possibilities. The touch-operable input devices 124, 126 may be capable of sensing movement in a direction parallel or planar to the pad surface, in a direction normal to the pad surface, or both, and may also be capable of sensing a level of pressure applied. The touch-operable input devices 124, 126 may take any number of shapes, such as planar, cylindrical, or spherical, for example. The touch-operable input devices 124, 126 may be formed of one or more translucent or transparent insulating layers and one or more translucent or transparent conducting layers. Edges of the touch-operable input devices 124, 126 may be formed to have a raised, indented, or roughened surface, so as to provide tactile feedback to a user when the user's touch reaches the edge of the touch-operable input devices 124, 126. Each of the touch-operable input devices 124, 126 may be operated independently, and may provide a different function.

Figure 2:
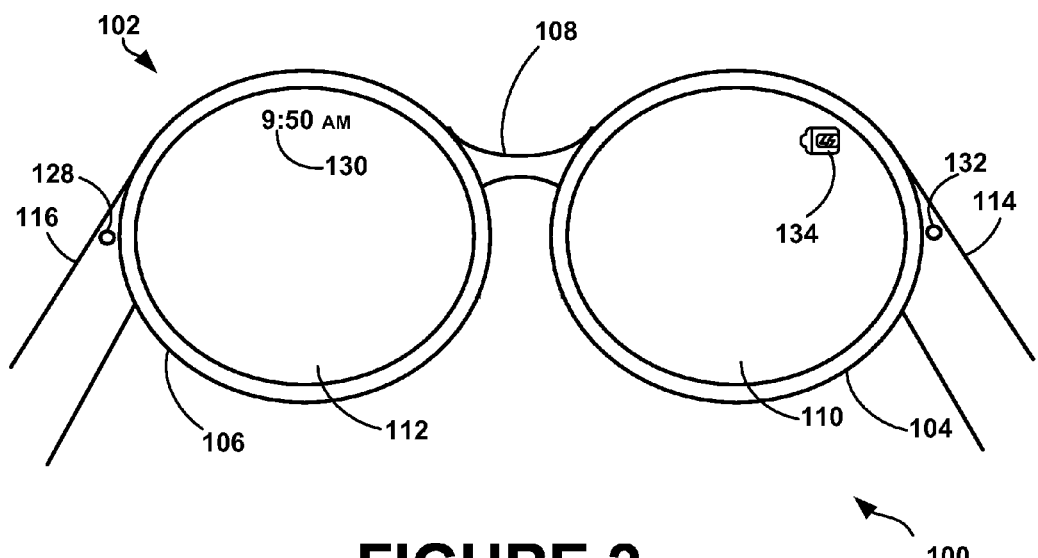
FIG. 2 shows an example embodiment of the interior of a wearable heads-up display device including display elements.

FIG. 2 illustrates an alternate view of the system 100 of FIG. 1. The eyeglasses 102 may include a first projector 128 coupled to an inside surface of the extending side-arm 116 and configured to project display information 130 onto an inside surface of the display element 112. Additionally or alternatively, a second projector 132 may be coupled to an inside surface of the extending side-arm 114 and configured to project a display 134 onto an inside surface of the display element 110.

The display elements 110 and 112 may act as a combiner in a light projection system and may include a coating that reflects the light projected onto them from the projectors 128 and 132. In some embodiments, a special coating may not be used (e.g., when the projectors 128 and 132 are scanning laser devices).

In alternative embodiments, other types of display elements may also be used. For example, the display elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104 and 106 for driving such a matrix display. Alternatively or additionally, a laser or LED source and scanning system could be used to draw a raster display directly onto the retina of one or more of the user's eyes. Other possibilities exist as well.

While FIGS. 1 and 2 show two touch-operable input devices or pads and two display elements, it should be understood that many exemplary methods and systems may be implemented in wearable computing devices with only one touch pad and/or with only one lens element having a display element. It is also possible that exemplary methods and systems may be implemented in wearable computing devices with more than two touch pads.

Figure 3:
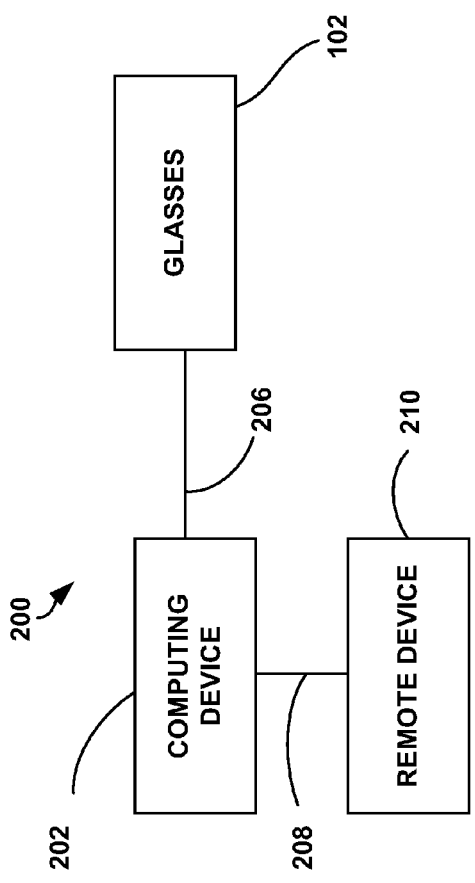
FIG. 3 shows a block diagram of an example embodiment of a wearable heads-up display system.

FIG. 3 shows an example embodiment of a wearable heads-up display system. As shown in FIG. 3, a wearable heads-up display system 200 may include glasses 102 coupled to a computing device 202 via a connection 206. The structure of computing device 202 will be described in more detail with respect to FIG. 12. In one embodiment, the computing device 202 may be incorporated into the glasses 102 themselves. In another embodiment, the computing device 202 may be a head-mounted computing device incorporated into, for example, a hat or helmet, or may be a body-mounted computing device incorporated into, for example, a waist-mounted cell phone or personal digital assistant. The connection 206 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities. The connection 206 may function to transmit data and/or commands to and/or from the glasses 102, to transmit input received from touch-operable input devices 124, 126, and/or to transmit display data for display on respective lenses 110 and/or 112.

Figure 4:
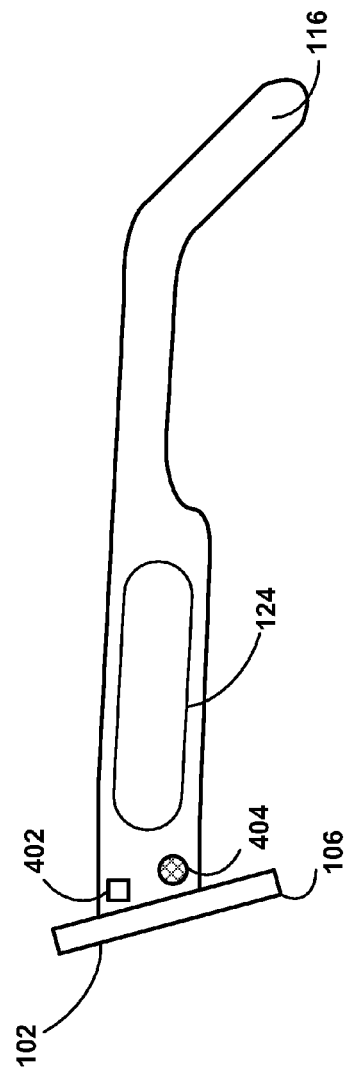
FIG. 4 shows an example embodiment of various input interfaces for a wearable heads-up display device, including an integrated touch-operable input device.

FIG. 4 shows an example embodiment of various input interfaces for glasses 102 that allows a user to interact with the glasses 102 and computing device 202. The input interfaces may comprise one or more of touch-operable input device 124, a movement sensor 402, and a microphone 404, among other possible input elements. While FIG. 4 illustrates a side-view of side-arm 116, additional and similar input interfaces may be provided on side-arm 114. For example, and as illustrated in FIGS. 1 and 2, an additional touch-operable input device 126 may be provided on side-arm 114.

Returning to FIG. 4, the touch-operable input device 124 may sense at least one of a position and movement of a touch or finger along a planar direction relative to a surface of the device 124 (e.g., parallel to the surface of FIG. 4) via capacitive sensing, resistance sensing, and/or via a surface acoustic wave (SAW) process, among other possibilities. In addition, the touch-operable input device 124 may be capable of sensing movement of a touch or finger in a direction normal to the surface of the device 124 (e.g., into the surface of FIG. 4), including perhaps sensing a level of pressure applied to the device 124.

In a capacitive touch pad, one or more insulating layers are coated with one or more conducting layers, and a driving signal is applied to at least one of the one or more conducting layers. As a user's body acts as a conductor, touching the pad with one's finger, for example, causes a distortion in at least one of the conducting layer's electrostatic field, measurable as a change in capacitance. Different capacitive technologies may be used to determine the location of the touch. For example, in a surface capacitance method, only one side of an insulating layer is coated with a conductive layer. A small voltage is then applied to the conductive layer, resulting in an electrostatic field. When a user touches the touch pad surface, a capacitor is dynamically formed, and a controller can determine the location of the touch indirectly from the change in capacitance. Alternatively, in a mutual capacitance method, vertically and horizontally-arranged driving lines (e.g., two conductive layers) are formed separated by an insulating layer. Bringing a finger or touch close to the surface of the array changes the local electrostatic field around an intersection of the separated driving lines, changing the mutual capacitance between driving lines at corresponding intersecting areas. Because the capacitance change can be measured simultaneously at each intersecting point of the driving lines, mutual capacitance can be used to determine touch locations at a plurality of locations (e.g., multi-touch).

In a resistive touch pad, two electrically conductive layers having horizontal and vertical lines are formed separated by an insulating gap (e.g., glass, plastic, air, etc.), and a voltage gradient is applied to the first conductive layer. When contact is made with the surface of the touch pad, the two conductive layers are pressed together, and the second sheet measures the voltage as distance along the first sheet, providing an X coordinate. After the X contact coordinate has been acquired, a second voltage gradient is applied to the second sheet to ascertain the Y coordinate. These two operations provide the touch location where contact was made.

In a SAW touch pad, conductive layers are not disposed throughout the pad itself. Rather, transmitting and receiving transducers and reflectors are disposed at edges of the touch pad. Waves emitted by the transmitting transducers are reflected across the touch pad in the X and Y directions and to receiving transducers via the reflectors. When a finger touches the screen, portions of the waves are absorbed, causing a touch event and its corresponding location to be detected by control circuitry.

While several types of touch pads are discussed here, other currently available and other future-developed touch-detection methods are included within the scope of this disclosure, such as proximity sensors and hand or finger-tracking depth sensors, for example.

As illustrated in FIG. 4, a width of the side-arm 116 may be formed thicker in a region in which the device or touch pad 124 is formed, and thinner in a region in which the touch pad 124 is not formed, so as to accommodate sufficient space to detect finger or touch movements in all planar directions (e.g., 360°), or at the very least, two pairs of diametrically opposed directions such as up, down, forward, and back.

Because the expanded width of the side-arm 116 in the region of the touch pad 124 may impede the peripheral vision of the user's eyes and/or may block the entrance of light, the side-arm 116 and/or the touch pad 124 may be formed of a translucent or substantially transparent material. For example, the side-arm 116 may be formed of a translucent or substantially transparent plastic material such as Acrylic (polymethlamethacrylate), Butyrate (cellulose acetate butyrate), Lexan (polycarbonate), and PETG (glycol modified polyethylene terphthalate). Other types of plastics could also be used. Translucent or substantially transparent materials other than plastic could also be used.

The touch pad 124 may be formed of one or more translucent or transparent insulating (e.g., glass or plastic) layers and one or more translucent or transparent conducting (e.g., metal) layers. The glass may be tempered or toughened glass manufactured through a process of extreme heating and rapid cooling. The plastic may be a polyimide, polyethylene, or polyester based plastic film. Other types of translucent and/or substantially transparent glasses and plastics could also be used. The conducting layer may be formed of a metal oxide, such as Indium Tin Oxide (ITO). Other types of insulating and conducting layers could also be used.

Edges of the touch pad 124 may be formed to have a raised, indented, or roughened surface, so as to provide tactile feedback to a user when the user's finger or touch reaches the edge of the touch pad 124. Such a structure may also allow a user (who has limited or no visual cues as to the location of the touch pad 124) to locate the touch pad 124 on the side-arm 116 quickly, similar to the way in which physical indentions normally provided on the "F" and "J" keys of a keyboard allow a typist to quickly position their fingers correctly on the keyboard. Of course, the raised indented, and/or roughened surface could alternatively or additionally be formed in the side-arm 116 just past the edge of the touch pad 124. A similar roughened, raised, or indented element may be provided at substantially a center of the touch pad 124 to provide additional tactile cues to a user.

The movement sensor 402 may be provided on or in a frame element of the glasses 102, and may act as an input device configured to track a user's movements. The movement sensor 402 may include one or more of an accelerometer, a magnetometer, or a gyroscope, among other options. An accelerometer is a device that measures acceleration. Single- and multi-axis models can detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, and resonant solids to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used.

The movement sensor 402 may be used, for example, to determine when, how much, and perhaps how quickly, a user wearing the glasses 102 turns or moves his or her head or body to the right, left, tilted up, or tilted down. The sensor 402 may also be able to determine a cardinal direction in which the user is facing.

Microphone 404 may be any acoustic-to-electric transducer or sensor that converts sound into an electrical signal. For example, microphone 404 may use electromagnetic induction, capacitance change, piezoelectric generation, or light modulation, among other techniques, to produce an electrical voltage signal from mechanical vibration. The microphone 404 may communicate with a speech recognition program at computing device 202 to allow a user to speak voice commands that cause the computing device 202 to take particular action(s). The microphone 404 may also be used for other purposes.

While one touch pad 124, one movement sensor 402, and one microphone 404 is illustrated in FIG. 4, in some embodiments a subset of these devices may be provided. In at least one embodiment, a plurality of touch pads may be disposed on the side-arm 116 and/or the side-arm 114. In another embodiment, an array of (same or different) microphones or array of (same or different) movement sensors may be provided on the side-arm 116 and/or the side-arm 114. Additionally, the touch pad 124 may be provided having a different shape or dimensions than that shown in FIG. 4.

The input interface may be wiredly or wirelessly coupled to the computing device 202 (perhaps via connection 206) to allow a user to control settings and features of the wearable heads-up display system 200, to initiate communications with other wearable heads-up displays, to provide positioning and/or movement information from sensor 402, and/or to control and interact with display elements 110, 112.

As illustrated in FIGS. 5*a* and 5*b*, display information 500 projected on display elements 110, 112 by projecting devices 128, 132 may include, for example, text of an e-mail, perhaps retrieved from an e-mail inbox associated with a user of the glasses 102 and stored at remote device 210. The e-mail text may represent just one e-mail out of a plurality of available e-mails. Another example of display information may be an Internet webpage. Other possibilities exist as well.

The display information 500 may appear as either a 2D or 3D image. For example, the display information 500 may appear as a ring or cloud of icons around the user. The user may then touch the touch pad 124, 126 to spin the ring.

According to an example embodiment, the display information 500 may appear at least partially curved when viewed on the display elements 110, 112. This curved display feature may be provided to add a third dimension to the display information 500 to help resolve the left-right ambiguity experienced by a user or wearer of the glasses 102. Thus, the curvature of the display information 500 may aid a user in determining how to operate touch pad 124 or 126 to interface with the display information 500. The curvature of the display feature may be virtual (e.g., created by the two-dimensional shape of the display area on a flat display) or actual (e.g., resulting from a display element that is itself curved). The virtual display curvature may be created by a processor transforming the display information 500 into a curved graphic, for example. The actual display curvature may include a curvature of one or both of the lens or display elements 110, 112. In one embodiment, the display information 500 may be projected onto a plane that is tilted to the left or right. In yet another embodiment, display information 500 may be shown on a non-curved, perspective-projected plane.

Figure 6:
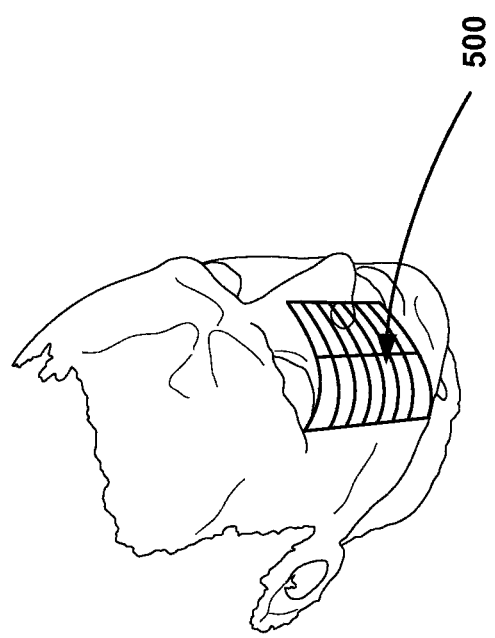
FIG. 6 illustrates an example shape of the display information shown on the wearable heads-up display device in relation to a user.

In an example embodiment, the eyeglasses 102 may provide a curved graphical display, with a curvature that generally follows the contour of the user's face, i.e., curves toward the user. FIG. 5*a* shows one embodiment where the curve of the display information 500 is gradual, The inner side 502 of the display information 500, or the side closest to the center frame support 108 (and the user's nose), may be oriented orthogonal or nearly orthogonal to the touch pad 124 and side-arm 114. The display information 500 may then curve around the user's face such that the angle between the touch pad axis and the display information 500 decreases as the display information curves in the direction of the user's ear, as shown in FIG. 6. The curve causes the outer side 504 of the display information 500, or the side closest to the side-arm 116, to appear longer than the inner side 502, as if the display information is moving toward the user. In this embodiment, the user appears to be viewing the display information 500 from the interior of a sphere. Thus, the movement of a touch forward toward the display element 110 on the touch-operable input device 124 will move a cursor to the left, toward display element 112. Similarly, the movement of a touch backward toward the user's ear on the touch-operable input device 124 will move a cursor to the right, toward display element 110.

In another example embodiment, shown in FIG. 5*b*, about 80% of the display information 500 is undistorted or flat and about 20% of the display information is curved. For example, only 20% of the display information 500 (near the outer side 504) may be curved so that most of the display information is left undistorted. In yet another embodiment, the main content of the display information 500 is shown undistorted in 80% of the display information, while other information (e.g., graphical guidelines, curved gridlines, etc.) is used or shown in the remaining 20% of the display information 500 (near the outer side 504). Thus, the actual content that the user is viewing remains undistorted. In this example a widescreen view may be used to allow for a better fit of the display information 500 on the display elements 110, 112.

In an alternate embodiment, shown in FIGS. 7a and 7b, the display information 500 may curve away from the user's face. That is, the curve causes the outer side 504 of the display information 500, or the side closest to the side-arm 116, to appear shorter than the inner side 502, as if the display information 500 is moving away from the user. In this embodiment, the user appears to be viewing the display information 500 from the exterior of a sphere. Thus, the movement of a touch forward toward the display element 110 on the touch-operable input device 124 will move a cursor to the right, toward display element 110. Similarly, the movement of a touch backward toward the user's ear on the touch-operable input device 124 will move a cursor to the left, toward display element 112. FIG. 7a shows one embodiment where the curve of the display information 500 is gradual. FIG. 7b shows another embodiment where about 80% of the display information 500 is undistorted and about 20% of the display information is curved (near the outer side 504).

In a further aspect, the display information 500 may initially appear curved when viewed by the user. However, after a predetermined period of time, such as 30 seconds, for example, the display information 500 may change or animate to a full-screen view. Thus, the left-right ambiguity of the touch pad 124 will be resolved, but the display information 500 will not remain distorted during the entire viewing period.

In yet a further aspect, the curved display information or feature may be located on a head-mounted display such that it is in the user's periphery vision. In such an embodiment, the user may focus on the curved display feature when desired, or "tune out" the curved display feature by looking forward.

Figure 8A:
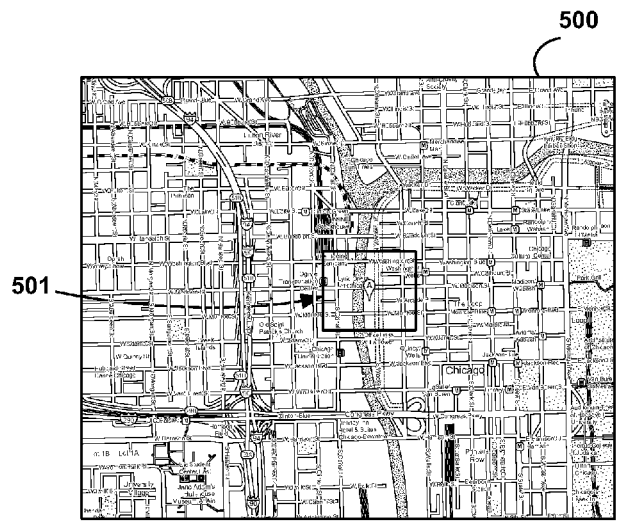
FIGS. 8a and 8b illustrate an additional embodiment of display information on the wearable heads-up display device.
Figure 8B:
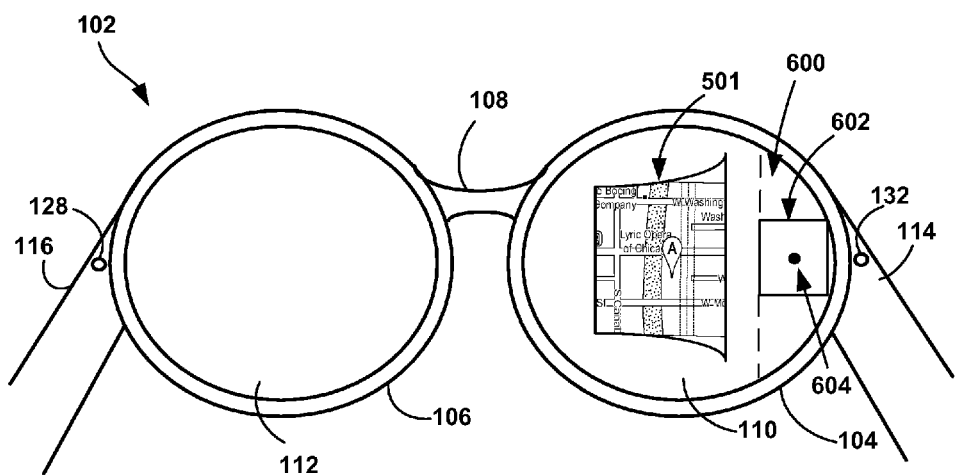

FIGS. 8a and 8b illustrate an additional embodiment of how display information 500 may be displayed on display elements 110, 112. In this embodiment, the display information 500 may be a large, panoramic view of information. For example, as shown in FIG. 8a, the size of the display information 500 may be larger than the size of the display elements 110, 112. Thus, only a portion 501 of the display information 500 may be viewed or shown on the display elements 110, 112 at a given time.

In order to accommodate the entirety of the display information 500, and to allow a user to navigate to different areas or portions of the display information within the display elements 110, 112, one or both of the display elements 110, 112 may include a navigation tool 600. The navigation tool 600 may be located to one side of the display element 110, and may include a virtual touchpad 602. The virtual touchpad 602 indicates and tracks the presence and/or location of a touch of a user on the touch-operable input device 124.

The user may then touch the touch-operable input device 124 to "grab" the display information 500 and move the display information so a different portion of the display information may be viewed on the display element 110. When the user "grabs" the display information 500, a cursor or dot 604 appears on the virtual touchpad 602 to indicate the presence and location of a touch of the user, and in which direction the display information 500 is being moved. The display information 500 is moveable in a substantially continual manner on the display element 110 by moving the touch of the user on the touch-operable input device 124.

In some embodiments, the navigation tool 600 may include an indication of which portion 501 of the display information 500 is being shown on the display elements 110, 112 in relation to other portions of the display information.

FIG. 9 illustrates another additional or alternative embodiment for interacting with glasses 102. As illustrated in FIG. 9, a touch pad 706 may be coupled to side-arm 116 and extend beyond the edges of the side-arm 116. While this arrangement provides for additional gesturing space and allows a user to create more advanced input patterns, it also blocks more light from a user's field of view, and blocks a user's peripheral vision to a greater extent than the integrated touch pad 124 of FIG. 4. Thus, in this scenario, the level of translucency and/or transparency of the touch pad 706 may become more important. Additionally, and advantageously, the touch pad 706 in this arrangement may be removable from the side-arm 116, and may be attached only when needed by a heads-up display user. Removable fasteners may include, among others, Velcro, hook and tabs, buttons, snaps, friction fittings, screws, strike and latch fittings, compression fittings, rivets, and grommets. Permanent fasteners could additionally or alternatively be used. An electrical connection to the touch pad 706 may be provided via a connector on the outer-surface of the side-arm 116, and communication between the touch pad 706 and computing device 202 may take place via a wired or wireless connection. Interfacing with glasses 102 via touch pad 706 may be accomplished in the same manner as set forth above with respect to FIGS. 1-8.

Figure 10:
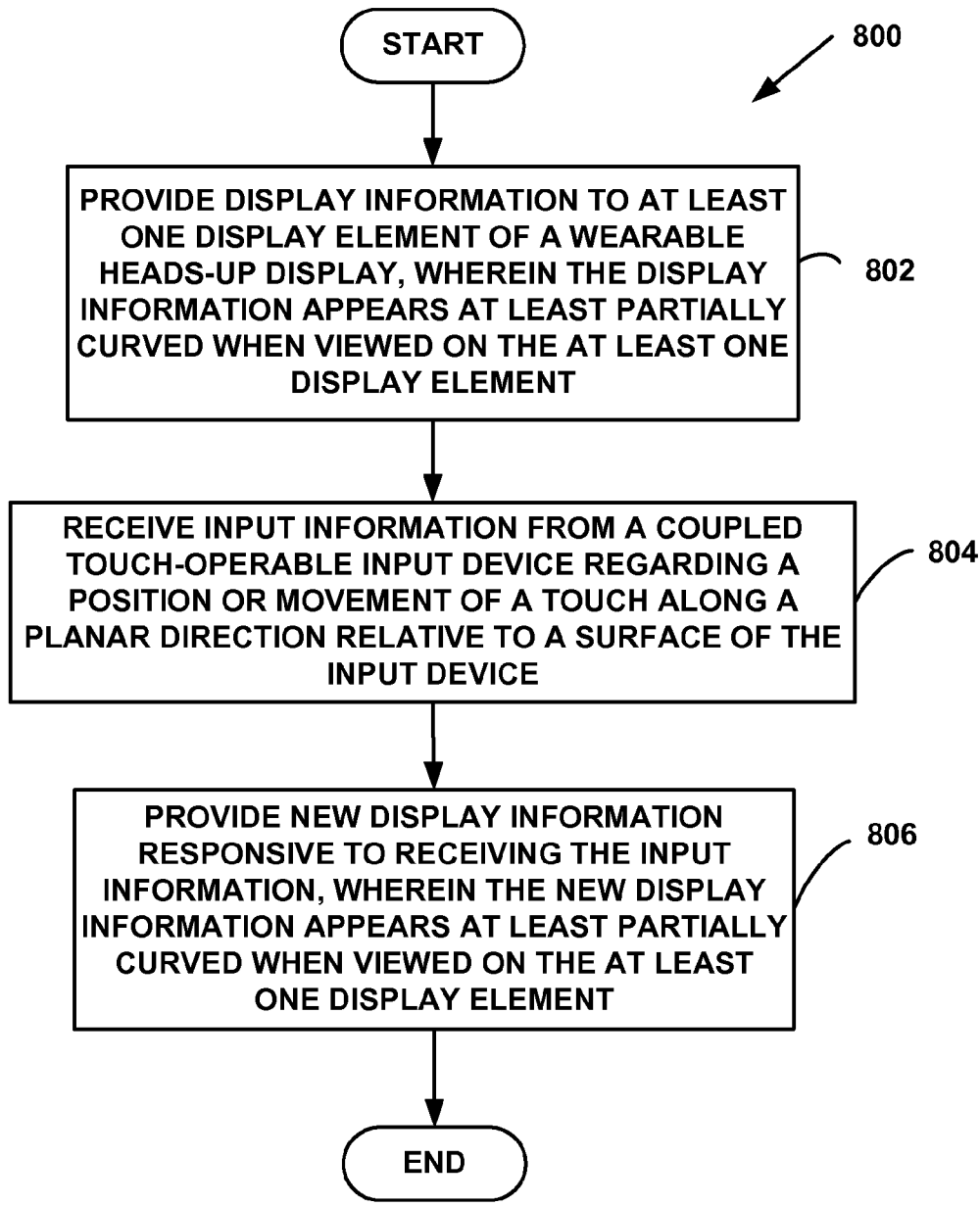
FIG. 10 is a flow-chart illustrating an example method of providing input to a wearable heads-up display device via an integrated touch-operable input device.

FIG. 10 is a flow-chart illustrating an example method 800 of interfacing with a heads-up display, such as glasses 102. The method 800 includes a first display step 802, an input step 804, and a second display step 806.

At step 802, display information is provided to at least one display element of a wearable heads-up display, wherein the display information appears at least partially curved when viewed on the at least one display element. This display information may include one or more supported functions relative to a currently-executing application, and may include, for each function, an associated input command (illustrated via a symbol) that may be executed at an input device to cause the corresponding function to be executed or corresponding selection to be selected. The associated input commands may be loaded from a list or database stored at computing device 202 and/or at remote device 210, and may vary depending upon a determination of the current application being executed by computing device 202.

At step 804, input information is received from a coupled touch-operable input device regarding a position or movement of a touch along a planar direction relative to a surface of the input device. This input information may be recognized as equal or equivalent to one of the associated input commands included in the display information at step 802. At step 806, new display information is provided to at least one display element (and perhaps the same at least one display element as in step 802) responsive to receiving the input information, wherein the new display information appears at least partially curved when viewed on the at least one display element.

Figure 11:
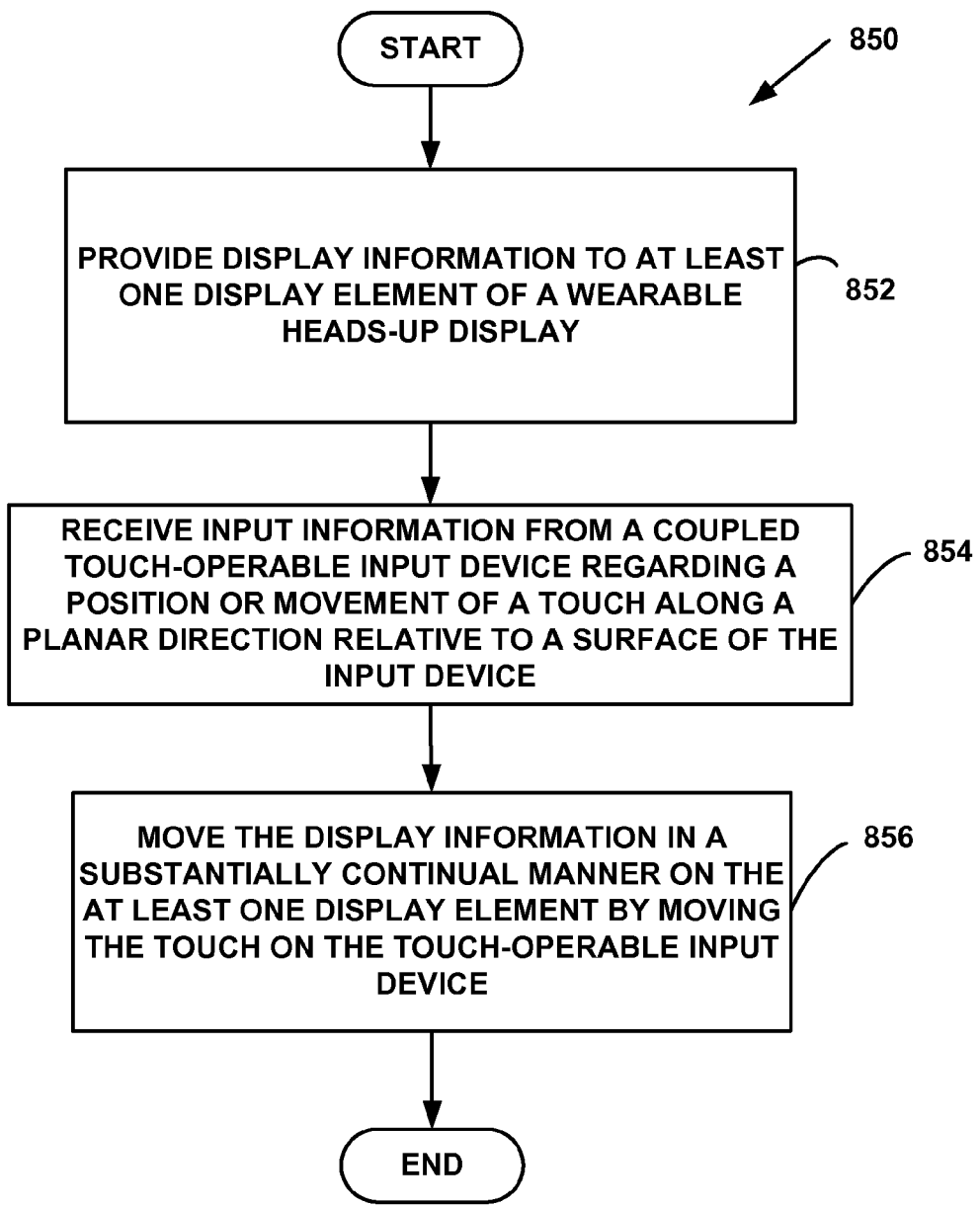
FIG. 11 is flow-chart illustrating another example method of providing input to a wearable heads-up display device via an integrated touch-operable input device.

FIG. 11 is a flow-chart illustrating another example method 850 of interfacing with a heads-up display, such as glasses 102. The method 850 includes a first display step 852, an input step 854, and a second display step 856.

At step 852, display information is provided to at least one display element of a wearable heads-up display. This display information may include one or more supported functions relative to a currently-executing application, and may include, for each function, an associated input command (illustrated via a symbol) that may be executed at an input device to cause the corresponding function to be executed or corresponding selection to be selected. The associated input commands may be loaded from a list or database stored at computing device 202 and/or at remote device 210, and may vary depending upon a determination of the current application being executed by computing device 202.

At step 854, input information is received from a coupled touch-operable input device regarding a position or movement of a touch along a planar direction relative to a surface of the input device. This input information may be recognized as equal or equivalent to one of the associated input commands included in the display information at step 802. At step 856, display information is moved in a substantially continual manner on the at least one display element by moving the touch on the touch-operable input device.

Figure 12:
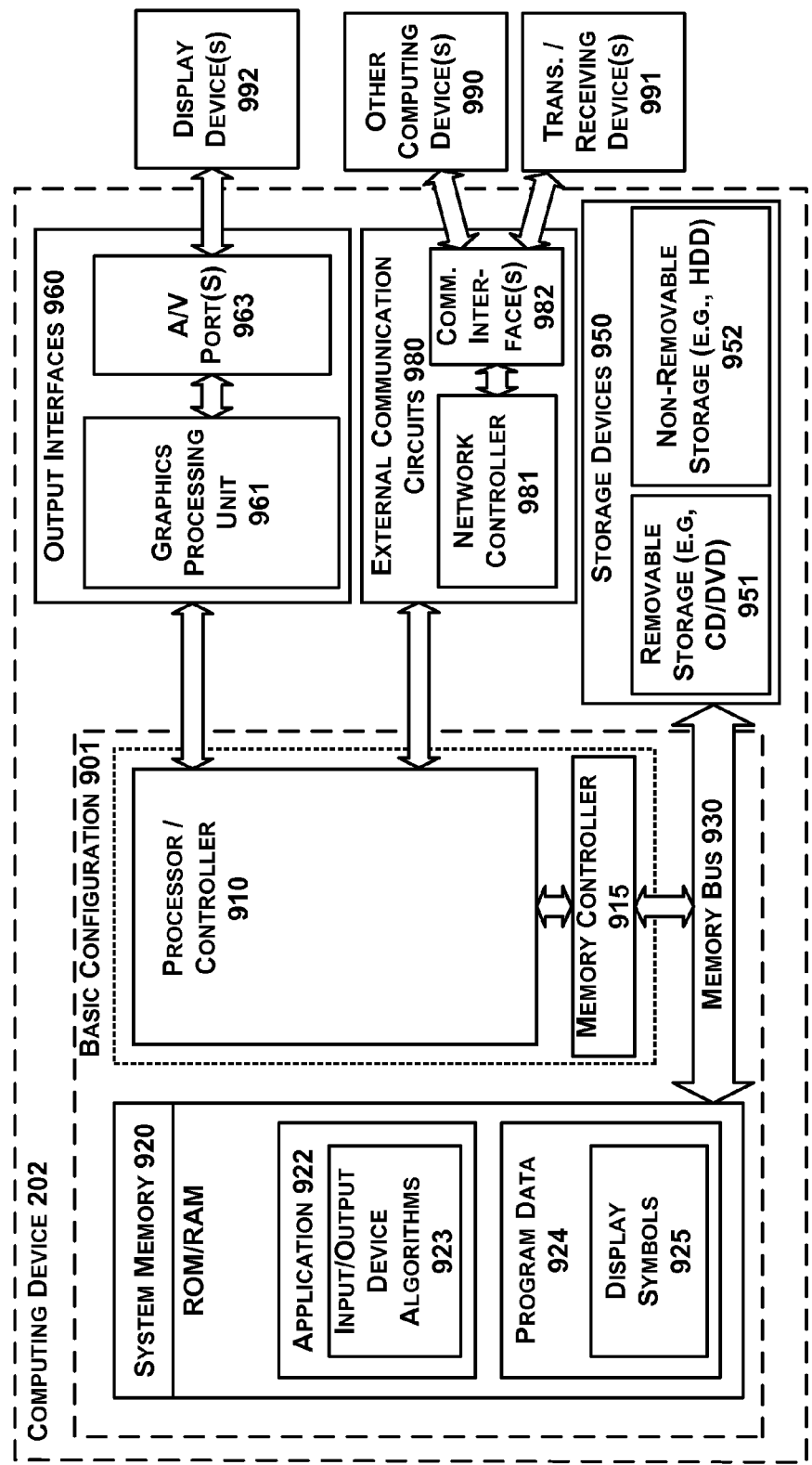
FIG. 12 is a functional block diagram of a computing device for supporting the wearable heads-up display device system of FIG. 1.

FIG. 12 is a functional block diagram of a computing device 202 for supporting the wearable heads-up displays set forth above arranged in accordance with at least some embodiments described herein. The computing device 202 may be a personal computer, mobile device, cellular phone, video game system, global positioning system, or other electronic system. In a very basic configuration 901, computing device 202 may typically include one or more processors or controllers (processor) 910 and system memory 920. A memory bus 930 can be used for communicating between the processor 910 and the system memory 920. Depending on the desired configuration, processor 910 can be of any type including, but not limited to, a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes one or more applications 922 and program data 924. Application 922 may include algorithms such as input/output device interface algorithms 923 arranged to control and interface with input devices such as finger or touch-operable touch pads, in accordance with the present disclosure. Other process descriptions, steps, or blocks in flow or message diagrams in the present disclosure should be understood as potentially representing modules, segments, or portions of code which include one or more executable instructions stored in application memory 922 for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Program data 924 may include, among other things, display symbols 925 that correspond to commands that may be executed via corresponding finger or touch-operable touch pad operations (or other input interfaces), and that may be included in display data sent to one or more display devices 992. In some example embodiments, applications stored in application memory 922 can be arranged to operate with program data 924. Computing device 202 can have additional features or functionality, and additional interfaces to facilitate communications between the basic configuration 901 and any devices and interfaces. For example, the data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

Computer storage media can include volatile and nonvolatile, removable and non-removable media implemented in any method or technology for storage of information, such as computer readable instructions, data structures, program modules, or other data.

System memory 920, removable storage media for use with removable storage devices 951, and non-removable storage 952 are all examples of computer storage media. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by computing device 202.

Computing device 202 can also include output interfaces 960 that may include a graphics processing unit 961, which can be configured to communicate to various external devices such as display devices 992 (which may include, for example, projecting devices 128, 132 and/or lens or display elements 110, 112) or speakers via one or more A/V ports 963. External communication circuits 980 may include a network controller 981, which can be arranged to facilitate communications with one or more other computing devices 990 and/or one or more transmitting and/or receiving devices 991. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media. The term tangible computer readable media may refer to storage media alone.

Computing device 202 can be implemented as a portion of a small-form factor portable (or mobile) electronic device such as a cell phone, a multi-chip module (MCM), an application-specific integrated circuit (ASIC), a field-programmable gate array (FPGA), a PDA, a personal media player device, a wireless web-watch device, a personal headset device, an application specific device, or a hybrid device that include any of the above functions. Computing device 202 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Figure 13:
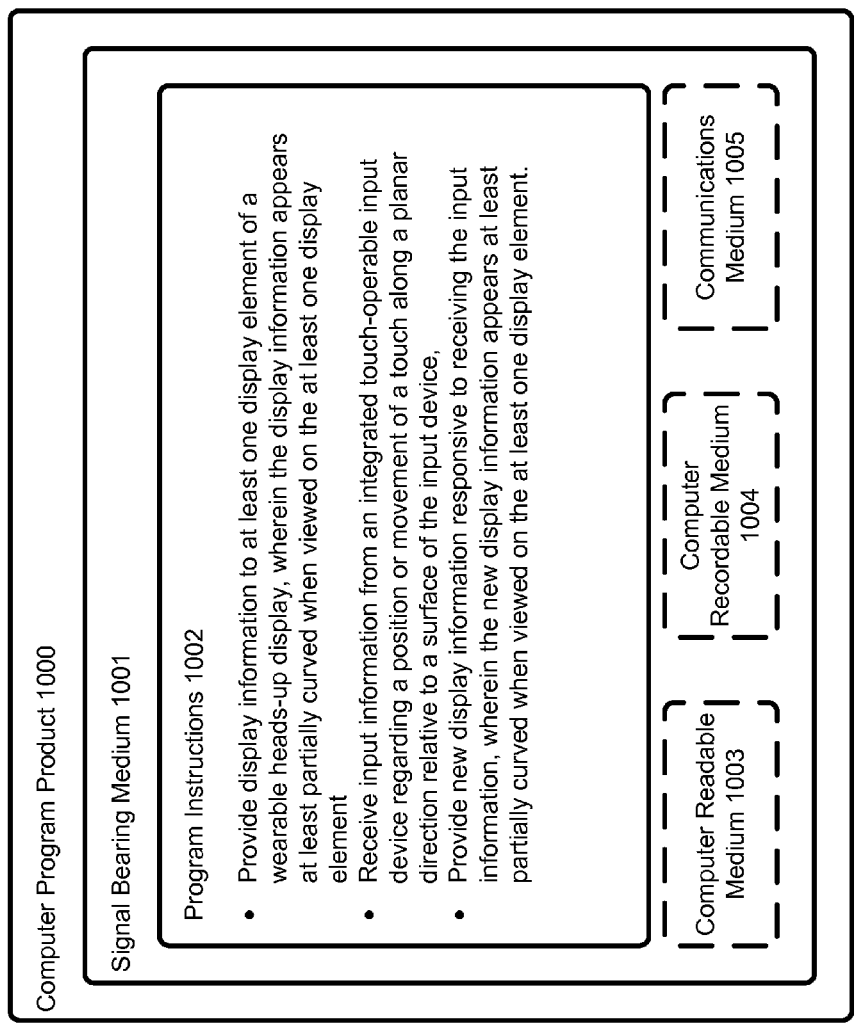
FIG. 13 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 13 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by one or more processors, may provide functionality or portions of the functionality described above with respect to FIGS. 1-11. Thus, for example, referring to the embodiment shown in FIG. 13, one or more features of method 800 may be undertaken by one or more instructions associated with the signal bearing medium 1001.

In some examples, the signal bearing medium 1001 may encompass a tangible computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 202 of FIG. 12 may be configured to provide various operations, functions, or actions in response to the programming instructions 1002 conveyed to the computing device 202 by one or more of the computer readable medium 1003, the computer recordable medium 1004, and/or the communications medium 1005.

Figure 14:
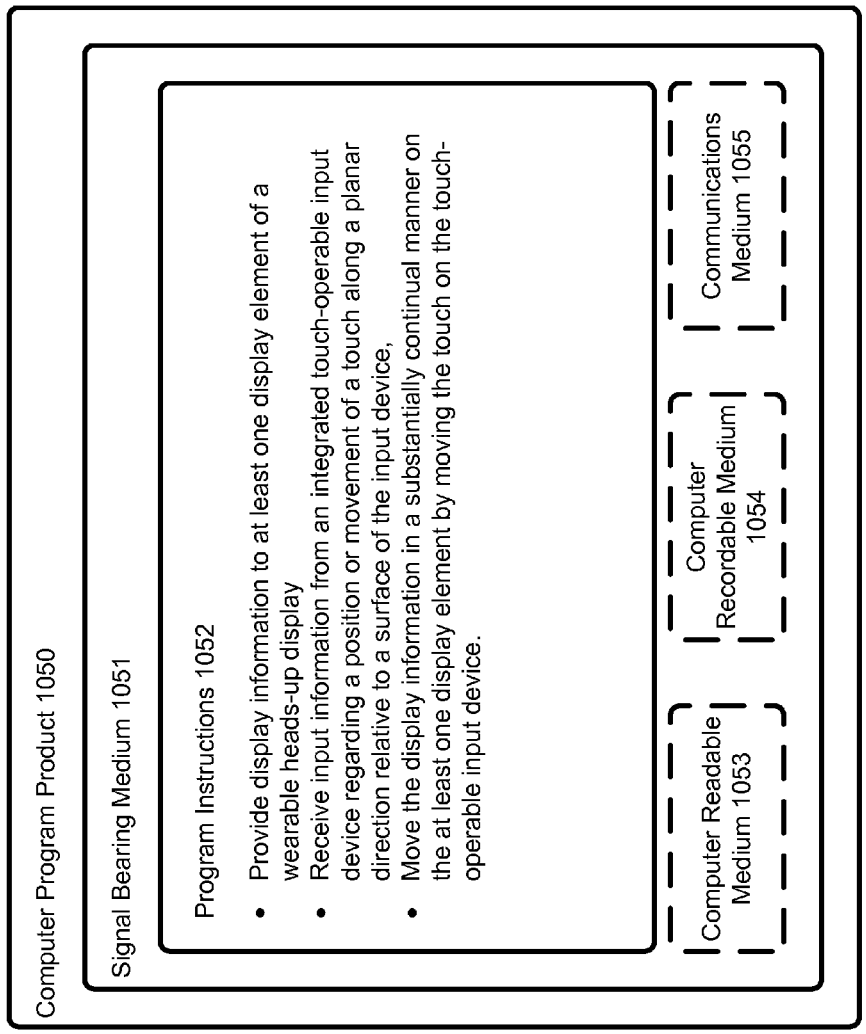
FIG. 14 is schematic illustrating a conceptual partial view of another example computer program product.

FIG. 14 is a schematic illustrating a conceptual partial view of another example computer program product 1050 that includes a computer program for executing a computer process on a computing device, arranged according to at least some embodiments presented herein. In one embodiment, the example computer program product 1050 is provided using a signal bearing medium 1051. The signal bearing medium 1051 may include one or more programming instructions 1052 that, when executed by one or more processors, may provide functionality or portions of the functionality described above with respect to FIGS. 1-11. Thus, for example, referring to the embodiment shown in FIG. 14, one or more features of method 850 may be undertaken by one or more instructions associated with the signal bearing medium 1051.

In some examples, the signal bearing medium 1051 may encompass a tangible computer-readable medium 1053, such as, but not limited to, a hard disk drive, a Compact Disc (CD), a Digital Video Disk (DVD), a digital tape, memory, etc. In some implementations, the signal bearing medium 1051 may encompass a computer recordable medium 1054, such as, but not limited to, memory, read/write (R/W) CDs, R/W DVDs, etc. In some implementations, the signal bearing medium 1051 may encompass a communications medium 1055, such as, but not limited to, a digital and/or an analog communication medium (e.g., a fiber optic cable, a waveguide, a wired communications link, a wireless communication link, etc.). Thus, for example, the signal bearing medium 1051 may be conveyed by a wireless form of the communications medium 1055 (e.g., a wireless communications medium conforming with the IEEE 802.11 standard or other transmission protocol).

The one or more programming instructions 1052 may be, for example, computer executable and/or logic implemented instructions. In some examples, a computing device such as the computing device 202 of FIG. 12 may be configured to provide various operations, functions, or actions in response to the programming instructions 1052 conveyed to the computing device 202 by one or more of the computer readable medium 1053, the computer recordable medium 1054, and/or the communications medium 1055.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A wearable heads-up display comprising: a processor;
   at least one display element configured to receive display information from the processor and to display the display information, wherein at least a portion of the display information appears curved when viewed on the at least one display element such that the portion of the display information that appears curved indicates a direction of movement in response to user interaction with a touch-operable input device;
   a wearable frame structure supporting the at least one display element and having at least one side-arm extending away from the at least one display element, the at least one side-arm configured to secure the heads-up display to a user body element in a manner that, when secured to the user body element, places the at least one display element within a field of view of a user; and
   the touch-operable input device secured to the at least one side-arm of the wearable frame structure and configured to sense at least one of a position and movement of a touch along a planar direction relative to a surface of the input device, and to provide corresponding input information to the processor, wherein when the indicated direction is curved toward the user, a touch movement forward will cause cursor motion to the left and a touch movement backward will cause cursor motion to the right and when the indicated direction is curved away from the user, a touch movement forward will cause cursor motion to the right and a touch movement backward will cause cursor motion to the left.

2. The wearable heads-up display of claim 1 wherein the processor transforms the display information into a curved graphic.

3. The wearable heads-up display of claim 1 wherein the at least one display element is curved.

4. The wearable heads-up display of claim 1 wherein the display information appears to curve toward the user.

5. The wearable heads-up display of claim 1 wherein the movement of a touch forward toward the at least one display element on the touch-operable input device moves a cursor to the left.

6. The wearable heads-up display of claim 1 wherein the movement of a touch forward toward the at least one display element on the touch-operable input device moves a cursor to the right.

7. The wearable heads-up display of claim 1 wherein the curved display information changes to a full-screen view after a predetermined period of time.

8. The article of manufacture of claim 1 wherein the display information appears to curve away from the user.

9. A method of providing input to a wearable heads-up display having a wearable frame structure supporting at least one display element and having at least one side-arm extending away from the at least one display element, the at least one side-arm configured to secure the heads-up display to a user body element in a manner that, when secured to the user body element, places the at least one display element within a field of view of a user, the method comprising:
   providing, via a processor coupled to the wearable frame structure, display information to the at least one display element, wherein at least a portion of the display information appears curved when viewed on the at least one display element such that the portion of the display information that appears curved indicates a direction of movement in response to user interaction with a touch-operable input device;
   receiving at the processor, via the touch-operable input device secured to the wearable frame structure and configured to sense at least one of a position and movement of a touch along a planar direction relative to a surface of the input device, corresponding input information representative of the at least one of the position and movement of the touch along the planar direction; and
   providing, via the processor, new display information to the at least one display element responsive to receiving the input information, wherein when the indicated direction is curved toward the user, a touch movement forward will cause cursor motion to the left and a touch movement backward will cause cursor motion to the right and when the indicated direction is curved away from the user, a touch movement forward will cause cursor motion to the right and a touch movement backward will cause cursor motion to the left.

10. The method of claim 9 wherein the processor transforms the display information into a curved graphic.

11. The method of claim 9 wherein the at least one display element is curved.

12. The method of claim 9 wherein the display information appears to curve toward the user.

13. The method of claim 9 wherein the movement of a touch forward toward the at least one display element on the touch-operable input device moves a cursor to the left.

14. The method of claim 9 wherein the movement of a touch forward toward the at least one display element on the touch-operable input device moves a cursor to the right.

15. The method of claim 9 wherein the curved display information changes to a full-screen view after a predetermined period of time.

16. The article of manufacture of claim 9 wherein the display information appears to curve away from the user.

17. An article of manufacture including a computer readable medium having instructions stored thereon that, in response to execution by a computing device of a wearable heads-up display having a wearable frame structure, cause the computing device to perform operations comprising:
   providing display information to at least one display element coupled to the wearable frame structure, wherein at least a portion of the display information appears curved when viewed on the at least one display element such that the portion of the display information that appears curved indicates a direction of movement in response to a user interaction with a touch-operable input device;
   receiving, via the touch-operable input device secured to the wearable frame structure and configured to sense at least one of a position and movement of a touch along a planar direction relative to a surface of the input device, corresponding input information representative of the at least one of the position and movement of the touch along the planar direction; and
   providing new display information to the at least one display element responsive to receiving the input information, wherein when the indicated direction is curved toward a user, a touch movement forward will cause cursor motion to the left and a touch movement backward will cause cursor motion to the right and when the indicated direction is curved away from the user, a touch movement forward will cause cursor motion to the right and a touch movement backward will cause cursor motion to the left.

18. The article of manufacture of claim 17 wherein the operations further comprise transforming the display information into a curved graphic.

19. The article of manufacture of claim 17 wherein the at least one display element is curved.

20. The article of manufacture of claim 17 wherein the display information appears to curve toward the user.

* * * * *